UNITED STATES PATENT OFFICE.

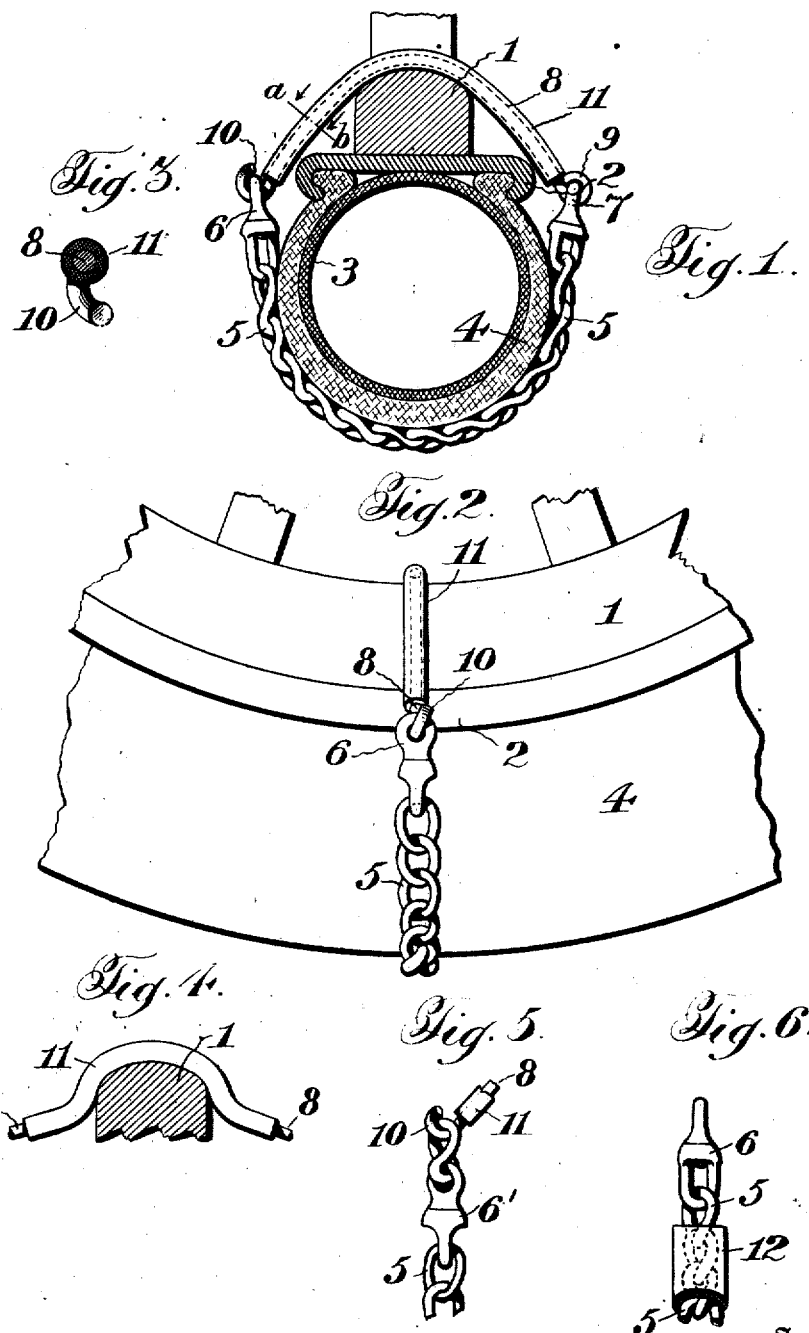

THOMAS CHARLES MARTIN, OF CLEVELAND, OHIO, ASSIGNOR TO BARRELL HOLDING AND MANUFACTURING COMPANY, A CORPORATION OF MAINE.

ANTISLIPPING DEVICE FOR VEHICLE-WHEELS.

999,384.   Specification of Letters Patent.   Patented Aug. 1, 1911.

Application filed September 12, 1906.  Serial No. 334,260.

*To all whom it may concern:*

Be it known that I, THOMAS CHARLES MARTIN, a citizen of the United States, residing at Cleveland, in the county of Cuyahoga and State of Ohio, have invented certain new and useful Improvements in Antislipping Devices for Vehicle-Wheels, of which the following is a specification.

This invention has for its principal objects, to simplify and reduce the cost of such devices without sacrificing their efficiency; to reduce to a minimum any tendency which anti-slipping devices generally have to injure the tire, and more especially anti-slipping devices of the chain type, and to produce a device which may with the greatest ease be attached to or removed from the vehicle wheel.

One specific form and some modifications of my said invention are illustrated in the accompanying drawings forming a part of this specification, and in which, Figure 1, is a cross-section through the felly, rim and tire of an automobile wheel, showing a form of my anti-slipping device thereon in elevation; Fig. 2, a fragmentary side elevation of said parts of a wheel with the anti-slipping device shown in Fig. 1 thereon in side elevation. Fig. 3, an enlarged detail sectional view taken along the line *a—b*, Fig. 1, and looking in the direction of the arrows; Fig. 4, a fragmentary detail view showing a modified form of yoke piece; Fig. 5, a fragmentary detail elevation showing a different arrangement of the swivel from that shown in Figs. 1 and 2; and Fig. 6, a detail fragmentary elevation showing a form of the said invention in which there is a protecting covering over the chain.

Referring to the accompanying drawings, 1 represents the felly, 2 the rim and 3 and 4 the inner tube and outer casing respectively of a pneumatic tire of an automobile or other vehicle wheel.

In the form shown in Figs. 1 to 3 of the accompanying drawings, my invention comprises a chain 5 of any suitable form, the ends of which are linked respectively to swivels 6 and 7. This chain is adapted to pass transversely across the tread of the wheel tire 4, and is held on the wheel by means of a holding device or yoke comprising a stiff spring wire 8 normally curved substantially as shown to straddle the wheel felly. One end of the piece 8 is bent to form an eye 9 which is linked to the swivel 7, as shown, and the other end of said piece 8 is bent to form a hook 10, adapted to engage the swivel 6, as shown. The end of the said hook is offset or bent to one side to facilitate its engagement with the swivel 6, as shown most clearly in Fig. 2.

In order to prevent the wire 8 from injuring the wheel felly and rim, and also for the purpose of keeping the same in place on the wheel, I provide said wire with a covering 11, preferably of rubber.

When the device is off the wheel, the wire 8 remains bent substantially as shown, though the ends may be slightly wider apart, and while the wire is preferably very stiff, it should have sufficient springing quality to perm the ends to be brought inward in placing the swivel 6 on the hook 10, so that after this is done the ends will again spring outward and prevent the swivel 2 from coming off the hook. The outward and upward springing of the ends of the wire 8, however, should not be such as to prevent some play or movement of the chain on the tire circumferentially of the wheel. Likewise since the yoke is loosely mounted on the felly—that is, has no permanent attachment thereto—it also is movable circumferentially of the wheel, being limited in such movement by the spokes, and retarded in such movement by the adhering, clinging or anti-slipping quality of the rubber covering which engages the felly. The movement of the chain circumferentially of the wheel may therefore cause the yoke to rock on the felly of the wheel, circumferentially of the wheel, the arms of the yoke following the pull of the chain.

In Fig. 4, I have shown a slightly modified form of my invention wherein the yoke and its felly protecting covering are so shaped as to extend over the edges of the felly and partly down in engagement with the sides thereof, the object of which arrangement is to more positively prevent or limit any tendency of said parts to slip sidewise or across the felly.

The function of the swivels is to permit the chain to turn on its longitudinal axis, and the object of this is to prevent the chain from twisting and kinking and thereby injuring the tire. Frequent experiments and tests with chain anti-slipping devices have shown, that when a chain passing across the wheel tread and fastened or linked at each end, is not provided with means, such for example as swivels, to permit the chain to turn as above set forth, the chain, by the tremendous force which is exerted on it in gripping the road surface will twist and finally kink, especially on the sides of the tire, and the result of this kinking of the chain is that it often bites pieces out of the tire and greatly injures the same. Moreover, the twisting of the chain lessens the length thereof and causes the chain to draw in with enormous force on the tire, much to the injury of the same. I have demonstrated by long and severe tests that these evil effects of chain anti-slipping devices may be positively eliminated by providing means such for example as the swivels herein described, arranged to permit the chain to turn on its longitudinal axis when the force which ordinarily produces the twisting, comes into play.

The swivels are greatly assisted or given increased effect in performing their function, by the capability of the arms of the yoke to rock as described and thus follow to a limited extent the pull of the chain circumferentially of the wheel, thereby keeping the arms of the yoke and swivels and chain adjacent thereto, on the respective sides of the wheel, in line, which makes the rotation of the swivel members easier and more certain. The further fact that the swivels are flexibly mounted at both ends, renders their action more certain than would be the case were one of the swivel members held rigidly. These swivels may be at the extreme ends of the chain, as shown in Figs. 1 and 2, or they may be inserted between links in the chain at any desired points, for example as shown in Fig. 5, and may be of any desired form.

I may also provide the chain with a flexible protecting covering which may be in the form of a tube 12 or other suitable form, and may pass over the entire length of the chain or over a portion of the same. This covering may be used to prevent the links of the chain from injuring the tire by the repeated pounding of the same against the tire.

In practice any desired number of these devices may be placed on a wheel, depending upon the conditions to be met, and as they may be placed on or removed from the wheel with the utmost ease, the number may be readily varied to meet the varying demands. Moreover, the device forming the subject of the present invention, being extremely simple in its construction, may be manufactured and offered to the trade at an extremely small cost, which is a very important consideration.

Other advantages of the said invention will more readily appear when the device is in use, and, also, other modifications may be made therein without departing from the spirit of the invention, it being understood that I do not confine myself to the specific details herein shown.

What I claim is:

1. An anti-slipping device for vehicle wheels, comprising a flexible body to pass across the tread of the wheel, swivels connected thereto to permit said flexible body to rotate bodily on a longitudinal axis, and means to hold the said parts on the wheel.

2. An anti-slipping device for vehicle wheels, comprising a chain to pass across the tread of the wheel, swivels connected thereto to permit said chain to rotate bodily on its longitudinal axis, and means to hold the said parts on the wheel.

3. An anti-slipping device for vehicle wheels, comprising a chain to pass across the tread of the wheel, swivels connected thereto to permit said chain to rotate bodily on its longitudinal axis, means to hold the said parts on the wheel, and a flexible covering on said chain.

4. An anti-slipping device for vehicle wheels, comprising a chain to pass across the wheel tread, swivels connected to said chain to permit the same to rotate bodily on its longitudinal axis, and a connecting yoke to hold said chain and swivels on said wheel.

5. An anti-slipping device for vehicle wheels, comprising a chain, swivels connected to said chain to permit the same to rotate bodily on its longitudinal axis, and a connecting yoke linked at one end permanently to said chain and provided at its other end with a hook adapted to be linked to and removed from the other end of said chain.

6. An anti-slipping device for vehicle wheels, comprising a chain, swivels connected to said chain to permit the same to rotate bodily on its longitudinal axis, a resilient metal connecting yoke adapted to straddle the wheel felly, having a bend therein to prevent side slipping on said felly, linked at one end permanently to said chain and provided at its other end with a hook adapted to be linked to and removed from the other end of said chain, and a protective covering over said yoke.

7. An attachment for vehicle wheels, comprising a flexible tire-embracing member, a yoke to movably straddle the wheel felly and having means for the attachment of its arms to said flexible member, and cushioning material secured to said yoke for engagement with said felly to cause the said yoke to cling thereto.

8. An attachment for vehicle wheels, comprising a flexible tire-embracing member, a yoke to movably straddle the wheel felly and having a rounded bearing surface for engagement with said felly to permit the said yoke to rock circumferentially of the wheel on said felly as a fulcrum, and means on said yoke for the attachment of the same to said flexible member.

9. An anti-slipping device for vehicle wheels, comprising a felly-embracing yoke, a chain, and a swivel having one rotatable member flexibly connected to the chain and another rotatable member flexibly connected to the yoke.

10. The combination with a vehicle wheel, of a felly-embracing yoke movable on said felly longitudinally thereof between two adjacent spokes but limited in said movement by said spokes, a flexible tire embracing member adapted to extend cross-wise of said tire, and means to flexibly connect said tire embracing member to the arms of said yoke.

11. The combination with a vehicle wheel, of a yoke mounted to movably straddle the wheel felly and rock circumferentially of the wheel on said felly as a fulcrum, a chain extending cross-wise of the tire tread, a swivel on each side of the center of said chain, each of said swivels having one of its rotatable members flexibly connected to said chain, and means to flexibly connect the other rotatable member of each swivel respectively to the arms of said yoke.

12. The combination with a vehicle wheel, of an anti-slipping device for said wheel, comprising a chain adapted to extend across the wheel tread, and means extending across the wheel felly, loosely mounted thereon and connected to the said chain to permit the same to rotate bodily on its longitudinal axis.

13. The combination with a vehicle wheel, of an anti-slipping device for said wheel, comprising a chain adapted to extend across the wheel tread, and means extending cross-wise of the wheel felly connected to the said chain to permit the same to rotate bodily on its longitudinal axis, a flexible tubular felly-protecting covering for said means, extending over the edges of said felly and shaped to limit side slipping thereof on said felly, said means being adapted to travel on said wheel in the direction of the circumference thereof from spoke to spoke between adjacent spokes, and the said chain being adapted to travel with said means.

14. An attachment for vehicle wheels, comprising a chain adapted to engage the road surface to prevent or reduce wheel slipping, and swivels each having two rotatable members both of which are flexibly connected to said chain, the parts being adapted and arranged to permit the chain when in action in contact with the road surface to rotate on its longitudinal axis.

15. An anti-slipping device for vehicle wheels, comprising a single chain to extend crosswise of the wheel tread, and means to hold said chain on said wheel, said means comprising a connecting yoke having means for connecting its arms to the ends of said chain, the whole forming a self contained unit, the said parts being adapted to be attached to the wheel in such manner as to permit the arms of said yoke to move to a limited extent in the direction of the circumference of said wheel and to thereby follow the pull of the chain in that direction.

16. An anti-slipping device for vehicle wheels, comprising a single chain to extend crosswise of the wheel tread, and means to hold said chain on said wheel, said means comprising an elongated flexible member to extend crosswise of the wheel rim, separable hook connection between one end of said member and one end of the chain, means to connect the other end of the said chain to the other end of said member, the whole forming a self contained unit, to be attached to said wheel in such manner as to permit the ends of said flexible member to move in the direction of the circumference of the wheel and thereby follow to a limited extent the pull of the chain in that direction.

17. A traction attachment for vehicle-wheels comprising a series of rotatably mounted gripping devices arranged transversely over the surface of the wheel-tire.

18. A traction attachment for vehicle-wheels comprising a series of rotatably mounted gripping devices flexibly linked together and arranged transversely over the surface of the wheel-tire.

In testimony whereof I affix my signature in presence of two witnesses.

THOMAS CHARLES MARTIN.

Witnesses:
J. JEROME LIGHTFOOT,
JAS. L. CRAWFORD.